US012785525B2

(12) United States Patent
Sugiyama et al.

(10) Patent No.: US 12,785,525 B2
(45) Date of Patent: Nov. 3, 2026

(54) APPARATUS FOR MANUFACTURING ROTOR AND METHOD FOR MANUFACTURING ROTOR

(71) Applicant: TOYOTA BOSHOKU KABUSHIKI KAISHA, Aichi-ken (JP)

(72) Inventors: Masaki Sugiyama, Okazaki (JP); Masaaki Takemoto, Toyokawa (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 113 days.

(21) Appl. No.: 18/628,032

(22) Filed: Apr. 5, 2024

(65) Prior Publication Data

US 2025/0317037 A1 Oct. 9, 2025

(30) Foreign Application Priority Data

Apr. 14, 2023 (JP) ................................ 2023-066461

(51) Int. Cl.
*H02K 15/12* (2025.01)
*H02K 15/03* (2006.01)

(52) U.S. Cl.
CPC ............ *H02K 15/12* (2013.01); *H02K 15/03* (2013.01); *H02K 2215/00* (2021.08)

(58) Field of Classification Search
CPC .... H02K 15/12; H02K 15/03; H02K 2215/00; B29C 33/16; B29C 2043/3211
See application file for complete search history.

(56) References Cited

U.S. PATENT DOCUMENTS 5,871,786 A * 2/1999 Hume ................ B29C 45/2711 425/549
2016/0181896 A1 6/2016 Masubuchi et al.
2018/0062488 A1* 3/2018 Okudaira .............. H02K 15/12

FOREIGN PATENT DOCUMENTS

| | | |
|---|---|---|
| JP | 8-90608 | 4/1996 |
| JP | 2016-119766 | 6/2016 |
| JP | 2020-1277 | 1/2020 |
| WO | 2016/147211 | 9/2016 |

OTHER PUBLICATIONS

Office Action Issued in Corresponding JP Patent Application No. 2023-066461, dated Jun. 30, 2026, along with an English translation thereof.

* cited by examiner

*Primary Examiner* — JaMel M Nelson
*Assistant Examiner* — Erica Hartsell Funk
(74) *Attorney, Agent, or Firm* — Greenblum & Bernstein, P.L.C.

(57) ABSTRACT

An apparatus for manufacturing a rotor includes a first die configured to contact a first end face of a rotor core to close first openings of magnet housing holes, and a second die configured to contact a second end face of the rotor core on a side opposite to the first end face. The second die includes a passage configured to introduce a thermoplastic in a molten state into second openings of the magnet housing holes. The second openings are on a side opposite to the first openings. The second die also includes a heater configured to heat the passage.

2 Claims, 7 Drawing Sheets

APPARATUS FOR MANUFACTURING ROTOR AND METHOD FOR MANUFACTURING ROTOR

BACKGROUND

1. Field

The present disclosure relates to an apparatus for manufacturing a rotor and a method for manufacturing a rotor.

2. Description of Related Art

International Publication No. WO2016/147211 discloses a thermoplastic filling device for a magnet-embedded core. The thermoplastic filling device described in the above publication fills magnet insertion holes of a rotor core, which house permanent magnets, with thermoplastic, thereby fixing the permanent magnets to the rotor core. The thermoplastic filling device includes an upper die and a lower die, which are arranged to face each other. The upper die and the lower die hold the rotor core in between, thereby fixing the rotor core. The lower die includes a lower die body and a runner plate attached to the upper surface of the lower die body. The lower die body includes a sprue portion connected to a nozzle of an injection molding machine. The runner plate includes runner portions and gate portions. The runner portions are grooves that are formed on the lower surface of the runner plate and extend radially from a central part located on the axis of the rotor core. Each gate portion is a hole that connects an end of the corresponding runner portion and the corresponding magnet insertion hole to each other. The runner portions and the upper surface of the lower die body form passages that connect the sprue portion and the gate portions to each other. After thermoplastic in a molten state fills the magnet insertion holes through the sprue portion, the runner portions, and the gate portions, the thermoplastic is cooled and cured.

In the thermoplastic filling device described in the above-described publication, the thermoplastic cured in the gate portions and the passages is discarded. This adversely affects the yield of the material.

Such thermoplastic may be pulverized and mixed with thermoplastic of a virgin material as a recycled material to be reused. However, since the maximum percentage of recycled material that can be mixed in a virgin material is approximately 30% by mass, the yield of the material is still relatively low.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for manufacturing a rotor is provided. The rotor includes a rotor core including multiple magnet housing holes, magnets accommodated in the magnet housing holes, and a thermoplastic filling the magnet housing holes and fixing the magnets to the rotor core. The apparatus includes a first die configured to contact a first end face of the rotor core to close first openings of the magnet housing holes, and a second die configured to contact a second end face of the rotor core on a side opposite to the first end face. The second die includes a passage and a heater. The passage is configured to introduce the thermoplastic in a molten state into second openings of the magnet housing holes. The second openings are on a side opposite to the first openings. The heater is configured to heat the passage.

In another general aspect, a method for manufacturing a rotor is provided. The method uses the apparatus for manufacturing a rotor. The method includes: housing the magnets in the magnet housing holes; introducing, through the passage, the thermoplastic in a molten state into the second openings in a state in which the first end face and the second end face of the rotor core are respectively in contact with the first die and the second die, thereby filling the magnet housing holes, which house the magnets, with the thermoplastic; and cooling the thermoplastic. The filling the magnet housing holes, which house the magnets, with the thermoplastic includes heating the thermoplastic in the passage with the heater.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An apparatus for manufacturing a rotor and a method for manufacturing a rotor according to a first embodiment will now be described with reference to FIGS. 1 to 7.

First, a rotor 10 of a magnet-embedded motor that is manufactured using an apparatus for manufacturing a rotor (hereinafter, a manufacturing apparatus 20) according to the present embodiment will be described with reference to FIGS. 1 and 2.

Rotor 10

Figure 1:
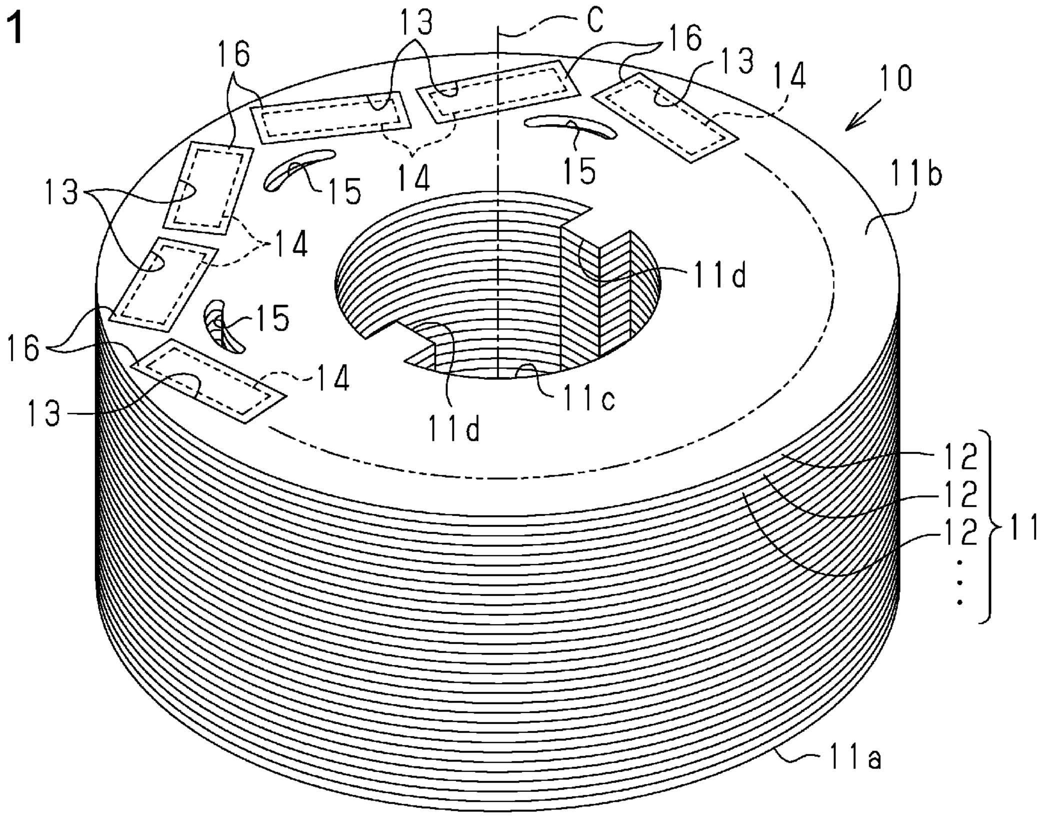
FIG. 1 is a perspective view of a rotor that is manufactured using an apparatus for manufacturing a rotor according to a first embodiment.
Figure 2:
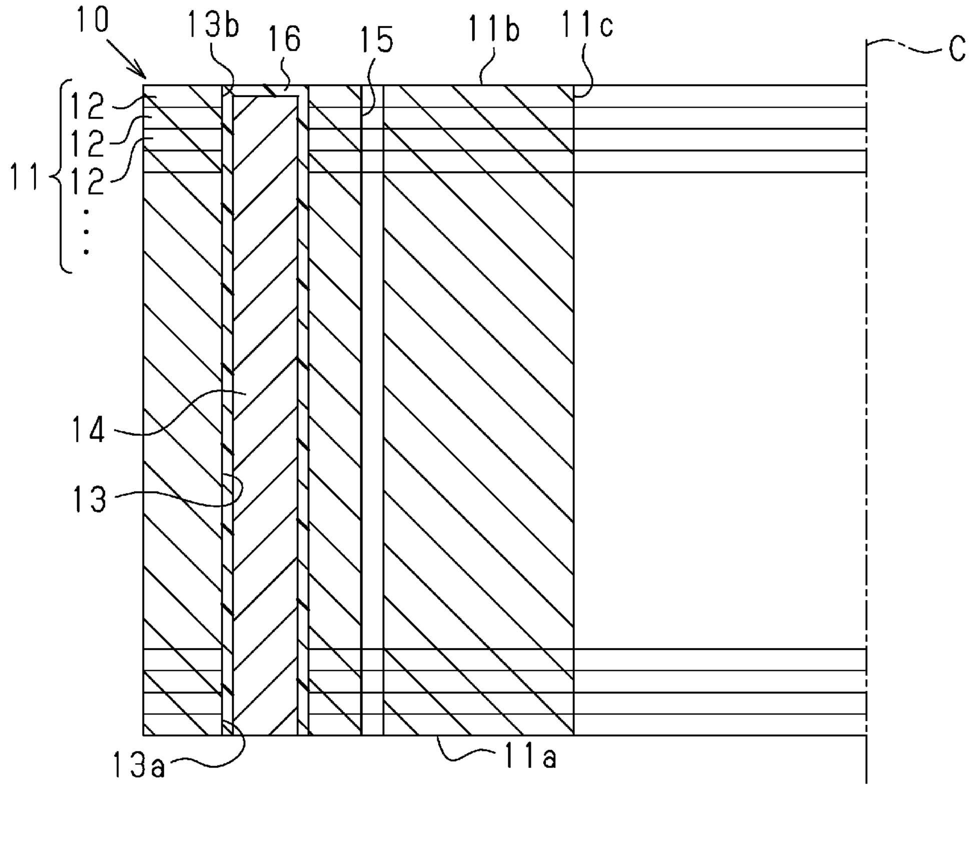
FIG. 2 is a cross-sectional view of the rotor shown in FIG. 1.

As shown in FIGS. 1 and 2, the rotor 10 includes a rotor core 11, which includes magnet housing holes 13, magnets 14 housed in the magnet housing holes 13, and a thermoplastic 16 filling the magnet housing holes 13 and fixing the magnets 14 to the rotor core 11.

The rotor core 11 is substantially shaped as a cylinder having an axis C. The rotor core 11 is formed by a laminated body in which core pieces 12 made of magnetic steel sheets are stacked.

In the following description, the axial direction of the rotor core 11 will simply be referred to as an axial direction, radial directions of the rotor core 11 will simply be referred to as radial directions, and a circumferential direction of the rotor core 11 will simply be referred to as a circumferential direction.

The magnet housing holes 13 are arranged at intervals in the circumferential direction. In the present embodiment, the magnet housing holes 13 are schematically depicted to have a substantially rectangular cross-sectional shape. A center hole 11*c* and the magnet housing holes 13 extend through the rotor core 11 in the axial direction.

Each magnet 14 has a rectangular parallelepiped shape extending in the axial direction.

The thermoplastic 16 is liquid crystal polymer (LCP).

Two key portions 11*d* project from the inner circumferential surface of the center hole 11*c* to be opposed to each other in a radial direction.

The rotor core 11 includes cooling holes 15 at positions radially inward of the magnet housing holes 13. The cooling holes 15 are spaced apart from one another in the circumferential direction. A cooling medium for cooling the magnets 14 flows through the cooling holes 15. Each cooling hole 15 has an arcuate cross-sectional shape that is curved along the circumferential direction of the rotor core 11. Each cooling hole 15 is located between two magnet housing holes 13 adjacent to each other in the circumferential direction. Each cooling hole 15 extends through the rotor core 11 in the axial direction.

The manufacturing apparatus 20 will now be described.

Figure 3:
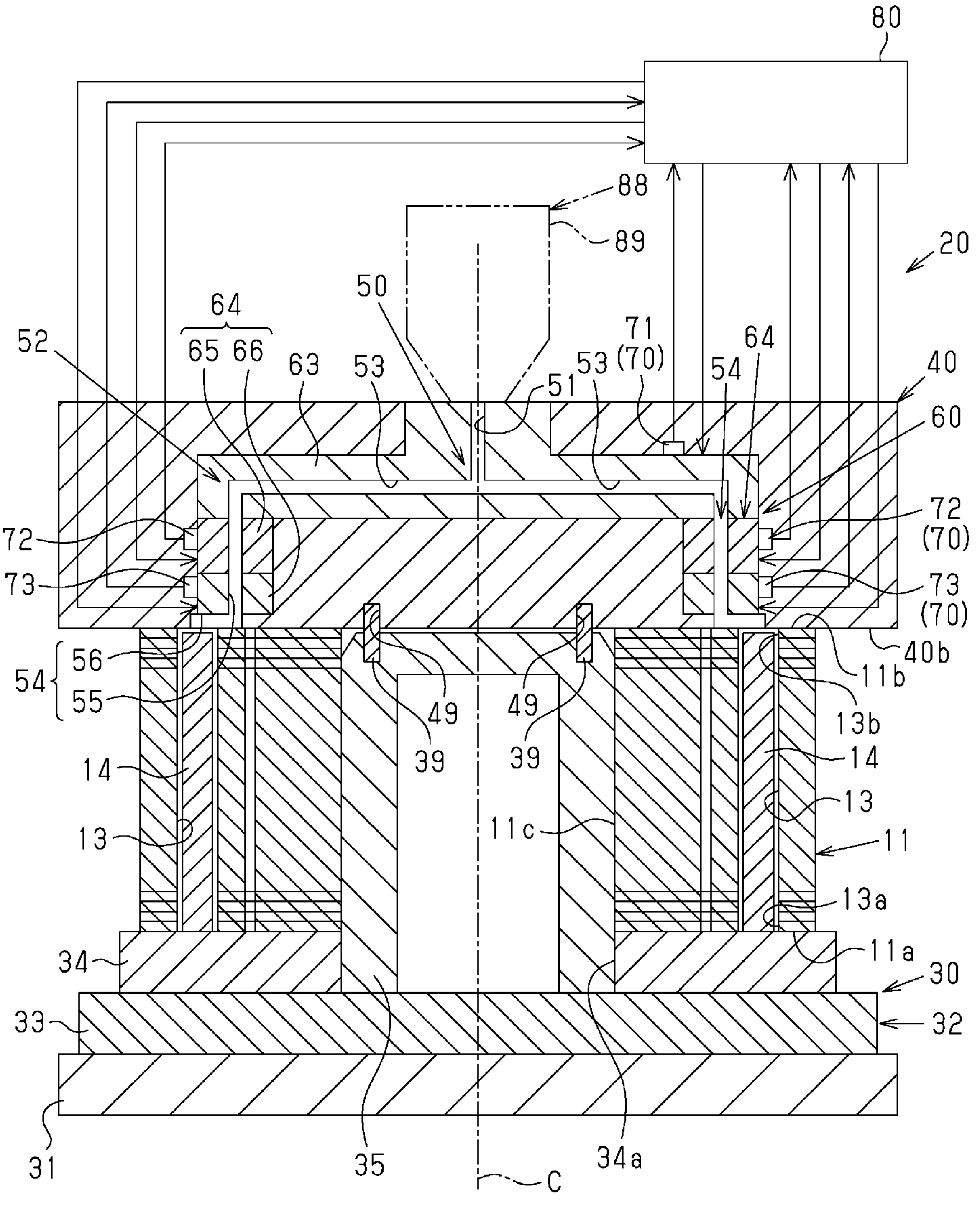
FIG. 3 is a cross-sectional view of the apparatus for manufacturing a rotor according to the first embodiment.

As shown in FIG. 3, the manufacturing apparatus 20 includes a first die 30, a second die 40, and a controlling unit 80.

First Die 30

As shown in FIG. 3, the first die 30 is disposed below the rotor core 11. The first die 30 includes a first die body 31, a conveying plate 32, which is disposed on the upper surface of the first die body 31, and a spacer 34, which is disposed on the upper surface of the conveying plate 32.

The conveying plate 32 conveys the rotor core 11. The conveying plate 32 includes a square plate body 33 and a post portion 35.

The post portion 35 is cylindrical and projects upward from the central part of the plate body 33. The post portion 35 is inserted into the center hole 11*c* of the rotor core 11. The post portion 35 includes two keyways (not shown), which extend in the axial direction of the post portion 35, on the outer circumferential surface. The key portions 11*d* of the rotor core 11 are respectively inserted into the keyways. The phase of the rotor core 11 with respect to the plate body 33 is determined by inserting the key portions 11*d* of the rotor core 11 into the keyways of the post portion 35.

Engaging pins 39 projecting upward are provided at the upper end of the post portion 35. The engaging pins 39 are spaced apart from each other in the circumferential direction.

The spacer 34 has a through-hole 34*a*, through which the post portion 35 is inserted. Two restricting projections (not shown) are provided on the inner circumferential surface of the through-hole 34*a*. The restricting projections are inserted into the two keyways of the post portion 35 to position the spacer 34 in relation to the plate body 33.

A first end face 11*a* of the rotor core 11 contacts the upper surface of the spacer 34 to close first openings 13*a* of the magnet housing holes 13.

Second Die 40

As shown in FIG. 3, the second die 40 is disposed above the rotor core 11. The second die 40 is disposed to approach and move away from the first die 30 in the axial direction.

The second die 40 includes engaging holes 49 in a lower surface 40*b*. The engaging holes 49 are configured to be engaged with the engaging pins 39.

The second die 40 includes a passage 50 and a heater 60, which heats the passage 50. In a state of being in contact with a second end face 11*b*, which is on the opposite side from the first end face 11*a* of the rotor core 11, the passage 50 introduces the thermoplastic in a molten state into second openings 13*b* of the magnet housing holes 13, which are on the opposite side from the first openings 13*a*.

Passage 50

Figure 4:
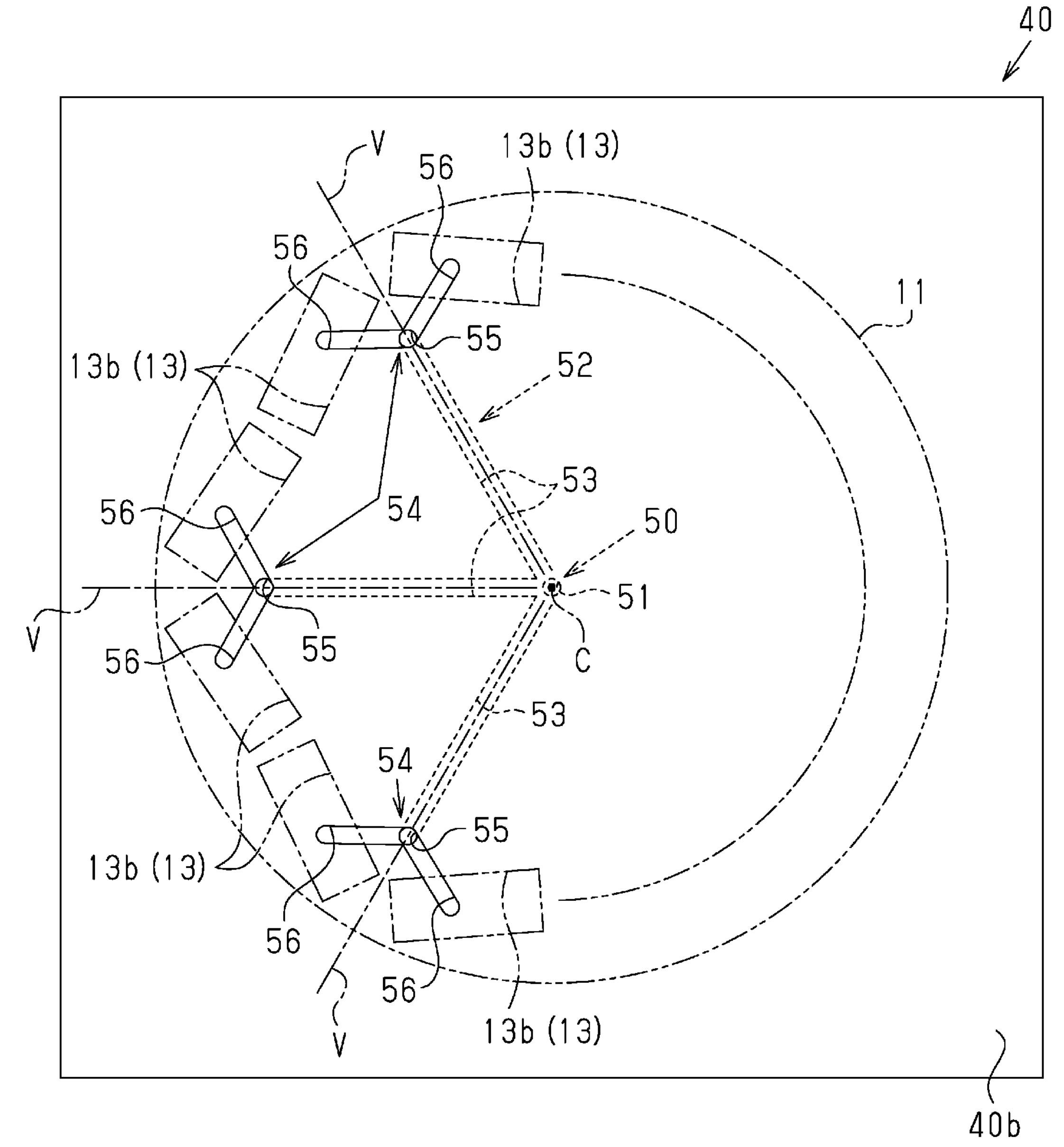
FIG. 4 is a bottom view of a second die of the apparatus for manufacturing a rotor shown in FIG. 3.

As shown in FIGS. 3 and 4, the passage 50 includes a sprue portion 51, which is connected to a nozzle 89 of an injection molding machine 88 (see FIG. 3), and a runner portion 52, which is connected to the sprue portion 51.

The sprue portion 51 is provided on the axis C of the rotor core 11.

The runner portion 52 includes manifold portions 53 that extend radially from the lower end of the sprue portion 51 in radial directions of the rotor core 11, and nozzle portions 54 that respectively extend from the manifold portions 53 toward the rotor core 11.

As shown in FIG. 4, the manifold portions 53 and the nozzle portions 54 are arranged to be rotationally symmetric with respect to the axis C.

As shown in FIGS. 3 and 4, each nozzle portion 54 includes an upstream section 55, which extends downward along the axis C from the corresponding manifold portion 53, and downstream sections 56, which branch from the distal end, or the lower end, of the upstream section 55 toward multiple (two in the present embodiment) magnet housing holes 13. Each downstream section 56 is connected to the second opening 13*b* of one of the magnet housing holes 13. The downstream sections 56 are grooves that open in the lower surface 40*b* of the second die 40 and extend along an imaginary plane orthogonal to the axis C. The downstream sections 56 and the second end face 11*b* of the rotor core 11 form passages that connect the upstream sections 55 to the magnet housing holes 13.

As shown in FIG. 4, the downstream sections 56 of each nozzle portion 54 are symmetrical with respect to an imaginary line V extending in the extending direction of the corresponding manifold portion 53.

Heater 60

As shown in FIG. 3, the heater 60 includes a manifold heating portion 63 and nozzle heating portions 64. The manifold heating portion 63 is configured to heat the manifold portions 53. The nozzle heating portions 64 are configured to heat the respective nozzle portions 54, which are connected to the manifold portions 53.

The manifold heating portion 63 is arranged on the radially outer side of the sprue portion 51 and the manifold portions 53 and includes a heating wire that generates heat when energized.

The nozzle heating portions 64 are arranged on the radially outer side of the upstream sections 55 of the nozzle portions 54, and generate heat when energized.

Each nozzle heating portion 64 includes a first nozzle heating section 65 and a second nozzle heating section 66. The first nozzle heating section 65 is configured to heat a proximal part, or the upper part, of the corresponding nozzle portion 54. The second nozzle heating section 66 is disposed to correspond to a distal part, or the lower part, of the corresponding nozzle portion 54.

Temperature Sensors 70

As shown in FIG. 3, the temperature sensors 70 include a first temperature sensor 71, second temperature sensors 72, and third temperature sensors 73.

The first temperature sensor 71 detects the temperature of the manifold heating portion 63.

Each second temperature sensor 72 detects the temperature of one of the first nozzle heating sections 65.

Each third temperature sensor 73 detects the temperature of one of the second nozzle heating sections 66.

The temperature sensors 71 to 73 each include, for example, a thermocouple.

Controlling Unit 80

The controlling unit 80 is electrically connected to the manifold heating portion 63, the first nozzle heating sections 65, the second nozzle heating sections 66, the first temperature sensor 71, the second temperature sensors 72, and the third temperature sensors 73.

The controlling unit 80 controls energization of each of the heater portion 63 and the heating sections 65, 66 based on temperature information detected by the sensors 71, 72, 73 such that the temperatures of the heater portion 63 and the heating sections 65, 66 become equal to target temperatures for the heater portion 63 and the heating sections 65, 66, which are input to the controlling unit 80 using an operation panel (not shown).

The method for manufacturing the rotor 10 will now be described.

The method for manufacturing the rotor 10 includes a measuring step, a filling step, and a cooling step.

Prior to the filling step, which will be discussed below, the measuring step measures the flowability of thermoplastic at each of nozzle portions using a rotor core 11 different from a rotor core 11 to be used in the filling step.

In the measuring step, thermoplastic in a molten state is introduced into the second openings 13*b* through the passage 50 with the first end face 11*a* and the second end face 11*b* of the rotor core 11 being respectively in contact with the first die 30 and the second die 40. The flowability of the thermoplastic at each of the nozzle portions 54 is measured based on a filling state of the thermoplastic 16 in the magnet housing holes 13. In the present embodiment, the magnet housing holes 13 of the rotor core 11 are filled with thermoplastic to about half their depth in a state in which the target temperatures of the respective nozzle heating portions 64 are maintained at the same level. Thereafter, the operator verifies the filling state of each magnet housing hole 13 visually, thereby determining that the nozzle portions 54 connected to the magnet housing holes 13 filled with a lesser amount of thermoplastic 16 than the others magnet housing holes 13, are the nozzle portions 54 with lower thermoplastic flowability.

Figure 5:
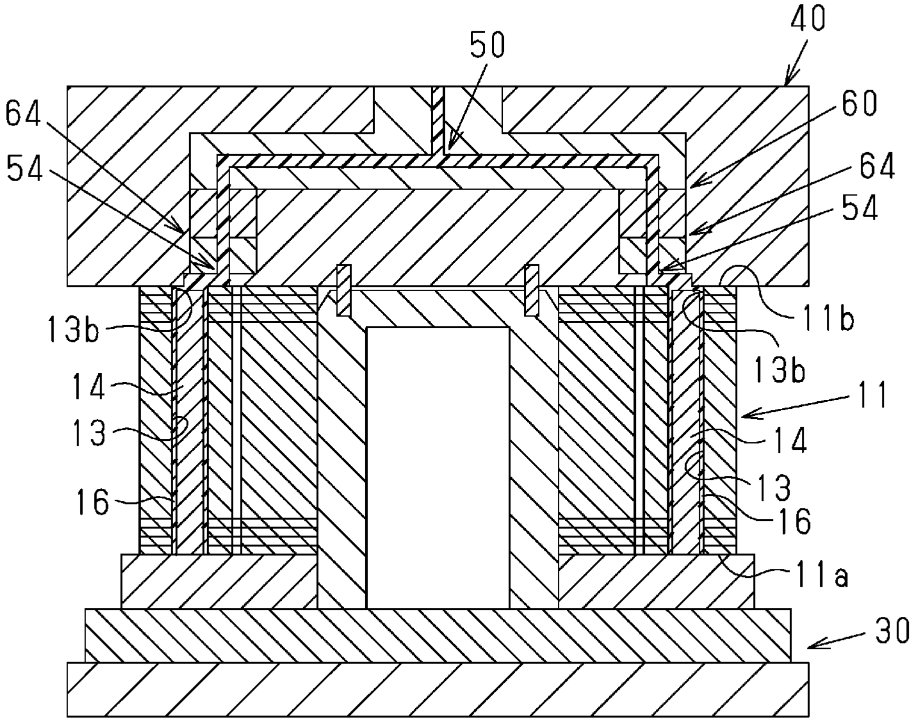
FIG. 5 is a cross-sectional view illustrating a state in which magnet housing holes are filled with thermoplastic.

Next, as shown in FIG. 5, in the filling step, the magnets 14 are housed in the magnet housing holes 13. Then, thermoplastic in a molten state is introduced into the second openings 13*b* through the passage 50 with the first end face 11*a* and the second end face 11*b* of the rotor core 11 being respectively in contact with the first die 30 and the second die 40, so that the magnet housing holes 13, which house the magnets 14, are filled with the thermoplastic 16.

When the magnet housing holes 13 are filled with the thermoplastic 16, the thermoplastic in the passage 50 is heated by the heater 60. The nozzle heating portions 64 are controlled to reach target temperatures for the respective nozzle heating portions 64, which have been determined in advance in the measuring step. The operator operates the operation panel (not shown) to set the target temperatures after the above-described measuring step. At this time, the nozzle heating portions 64 are controlled such that the nozzle portions 54 that have been measured to have a relatively low thermoplastic flowability become hotter than the nozzle portions 54 that have been measured to have a relatively high thermoplastic flowability.

Next, in the cooling step, the thermoplastic 16 filling the magnet housing holes 13 is cooled. At this time, the operation of the second nozzle heating sections 66 is stopped so that thermoplastic 16*a* at the distal end of each upstream section 55 is cooled (refer to FIG. 6). This cures the thermoplastic 16*a* at the distal end of each upstream section 55, blocking the flow of the thermoplastic in the passage 50.

Figure 6:
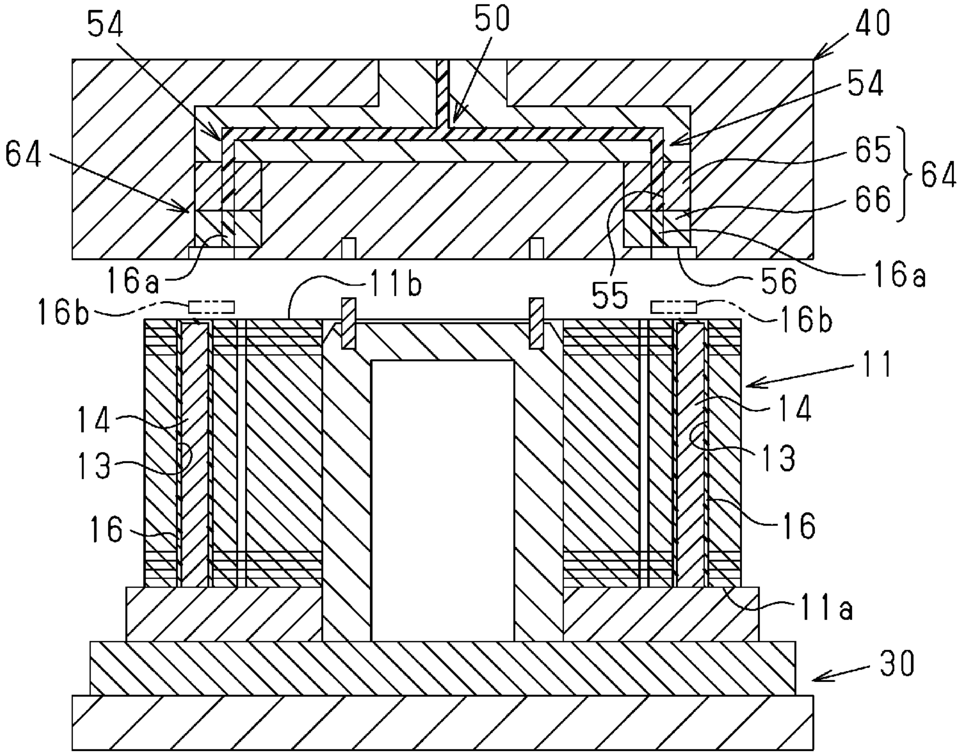
FIG. 6 is a cross-sectional view illustrating a state in which the second die is separated upward from a rotor core.

Finally, as shown in FIG. 6, the second die 40 is moved upward to separate from the first die 30, and the thermoplastic contained in the magnet housing holes 13 is separated from the thermoplastic remaining in the second die 40. When the second die 40 is separated from the first die 30, thermoplastic 16*b*, which has been cured in the downstream sections 56, is fixed to the second end face 11*b* of the rotor core 11. The thermoplastic 16*b* fixed to the second end face 11*b* is removed in a post-process.

Operation of the first embodiment will now be described.

Figure 12:
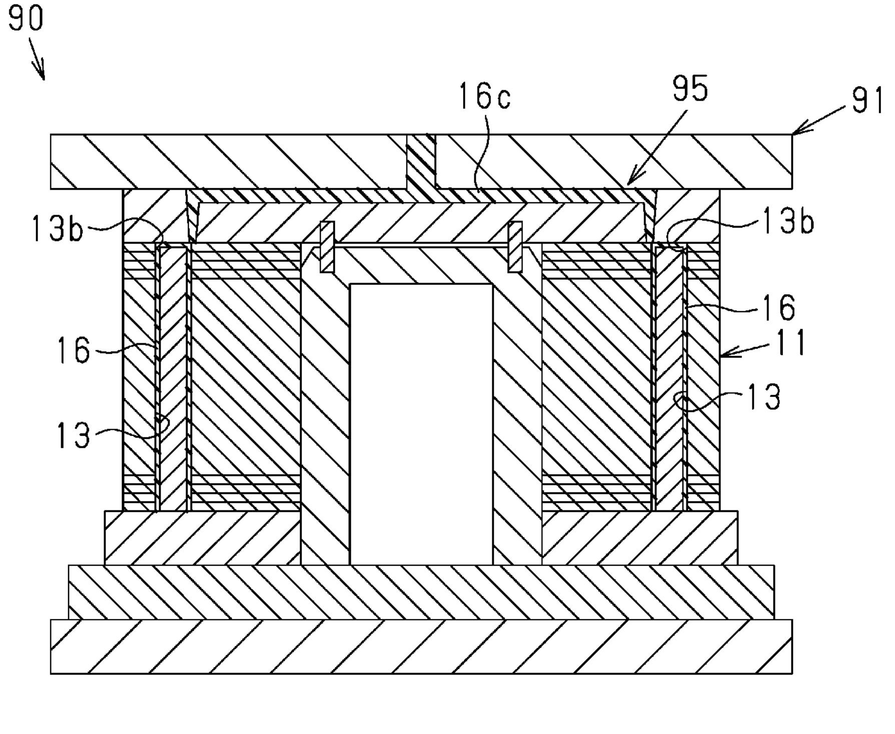
Fig.12 (Related Art)
FIG. 12 is a cross-sectional view showing an apparatus for manufacturing a rotor according to a related art.

As shown in FIG. 12, a manufacturing apparatus 90 of a related art includes a second die 91, which includes a passage 95. The passage 95 introduces thermoplastic in a molten state to the second openings 13*b* of the magnet housing holes 13. In the manufacturing apparatus 90, the rotor core 11, with the magnet housing holes 13 filled with the thermoplastic 16, is cooled together with the second die 91. At this time, since the passage 95 is also filled with thermoplastic 16*c*, the thermoplastic 16*c* in the passage 95 is also cooled. Therefore, when the second die 91 is subsequently used to fill the magnet housing holes 13 with thermoplastic, the thermoplastic 16*c* cured in the passage 95 is discarded.

In this respect, since the manufacturing apparatus 20 heats the passage 50 with the heater 60 as shown in FIG. 5, the thermoplastic cured in the passage 50 is melted again and injected into the magnet housing holes 13. Thus, the thermoplastic cured in the passage 50 does not need to be discarded.

The first embodiment has the following advantages.

(1-1) The second die 40 includes the passage 50 and the heater 60. The passage 50 introduces thermoplastic in a molten state to the second openings 13*b*, which are located on the opposite side of the magnet housing hole 13 from the first openings 13*a*. The heater 60 heats the passage 50.

This configuration operates in the above described manner and thus improves the yield of the material.

(1-2) The runner portion 52 includes the manifold portions 53, which extend radially from the sprue portion 51 in radial directions of the rotor core 11, and the nozzle portions 54, which extend from the manifold portions 53 toward the rotor core 11. The nozzle portions 54 are respectively connected to the manifold portions 53. The heater 60 includes the manifold heating portion 63, which heats the manifold portions 53, and the nozzle heating portions 64, which heat the nozzle portions 54.

With this configuration, the thermoplastic injected from the nozzle 89 of the injection molding machine 88 into the sprue portion 51 is introduced to the second openings 13*b* of the magnet housing holes 13 through the manifold portions 53 and the nozzle portions 54. This simplifies the structure of the injection molding machine 88.

Further, the nozzle portions 54 are each provided with a nozzle heating portion 64, so that the thermoplastic in each nozzle portion 54 can be heated individually. This allows for separate adjustment of the heating temperature of the thermoplastic in the nozzle portions 54, and thus separate adjustment of the flowability of thermoplastic.

(1-3) The nozzle portions 54 each include the upstream section 55, which extends along the axis C from the corresponding manifold portion 53, and the downstream sections 56, which branch from the distal end of the upstream section 55 toward the magnet housing holes 13.

Since the nozzle heating portions 64 are provided for the respective nozzle portions 54, the outer diameter of each nozzle portion 54 including the heater 60 is relatively large. Accordingly, if the outer diameter of the rotor core 11 is relatively small, it would be difficult to arrange the nozzle portions 54 due to interference between the nozzle portions 54.

In this regard, with the above-described configuration, the nozzle portions 54 each include one upstream section 55 and downstream sections 56 branched toward the magnet housing holes 13. This reduces the number of the nozzle portions 54 in relation to the number of the magnet housing holes 13. This allows the nozzle portions 54 to be arranged even when the outer diameter of the rotor core 11 is relatively small.

(1-4) In the filling step, the heater 60 heats the thermoplastic in the passage 50.

This method achieves an advantage similar to the above-described advantage (1).

(1-5) In the filling step, the nozzle heating portions 64 are controlled such that the nozzle portions 54 that have been measured to have a relatively low thermoplastic flowability become hotter than the nozzle portions 54 that have been measured to have a relatively high thermoplastic flowability.

With this method, the nozzle heating portions 64 are controlled such that the nozzle portions 54 that have a relatively low thermoplastic flowability become hotter than the nozzle portions 54 that have a relatively high thermoplastic flowability. This increases the flowability of the thermoplastic in the nozzle portions 54 that have a relatively low flowability, and thus limits variations in the pressure of the thermoplastic filling the magnet housing holes 13 among the magnet housing holes 13. This limits variations in the stress acting on the rotor core 11 due to filling of the thermoplastic among the magnet housing holes 13.

Second Embodiment

A second embodiment will now be described with reference to FIGS. 7 and 8.

The second embodiment is different from the first embodiment in that a single nozzle portion is provided for each magnet housing hole 13. That is, each nozzle portion of the second embodiment does not include the downstream section 56 described in the first embodiment.

Differences from the first embodiment will mainly be discussed below.

In the following description, the same reference numerals are given to those components that are the same as those in the first embodiment. Also, reference numerals 1, which are obtained by adding 100 to the reference numerals  in the first embodiment, are given to the corresponding components, and redundant explanations are omitted.

Figure 7:
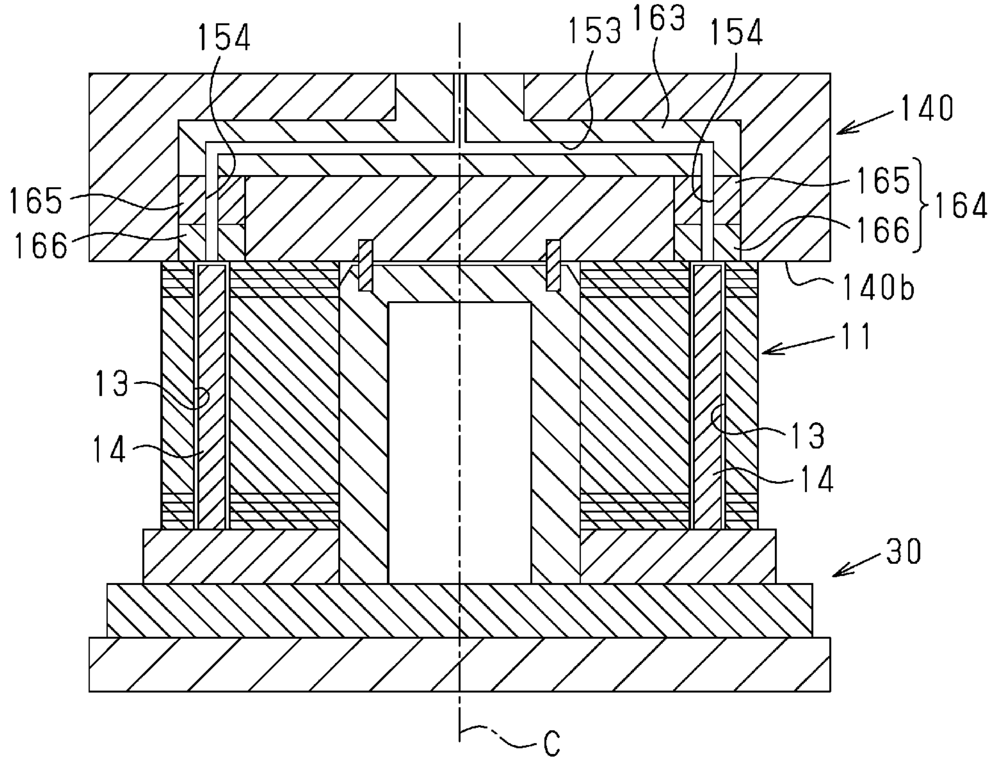
FIG. 7 is a cross-sectional view of an apparatus for manufacturing a rotor according to a second embodiment.

As shown in FIG. 7, each nozzle portion 154 extends downward from a manifold portion 153 along the axis C and opens in a lower surface 140*b* of a second die 140.

Figure 8:
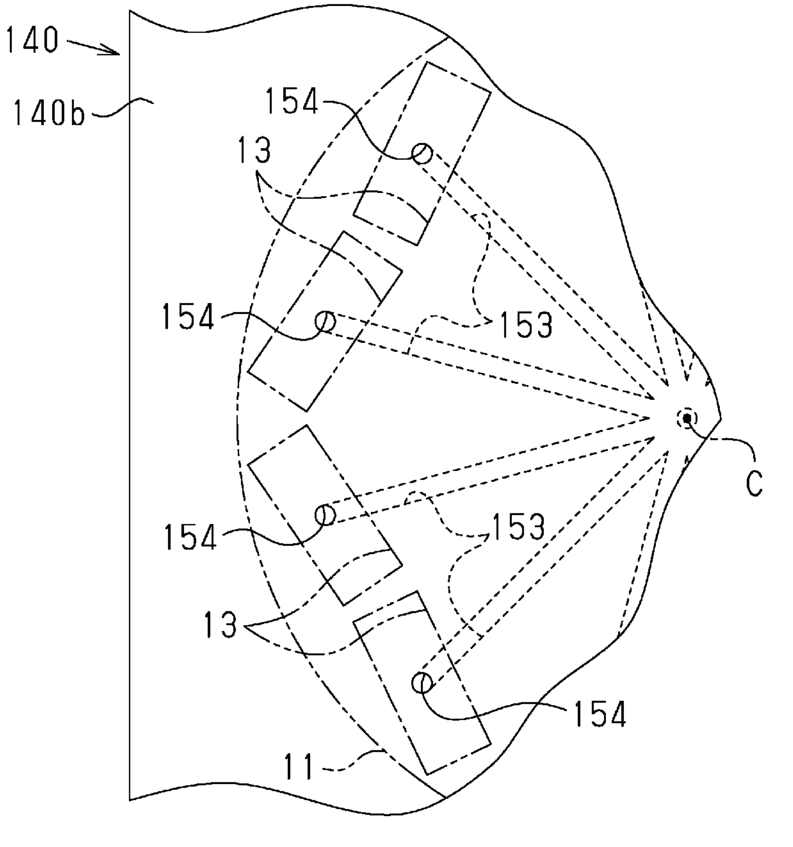
FIG. 8 is a bottom view of a second die of the apparatus for manufacturing a rotor shown in FIG. 7.

As shown in FIG. 8, the nozzle portions 154 open in regions in the lower surface 140*b* of the second die 140 that overlap with the magnet housing holes 13 in the axial direction.

The second embodiment has operation and advantages equivalent to (1-1), (1-2), (1-4), and (1-5) of the first embodiment.

Third Embodiment

A third embodiment will now be described with reference to FIGS. 9 and 10.

The third embodiment is different from the first embodiment in that the second die includes a second die body and a plate portion disposed between the second die body and the rotor core 11.

Differences from the first embodiment will mainly be discussed below.

In the following description, the same reference numerals are given to those components that are the same as those in the first embodiment. Also, reference numerals 2, which are obtained by adding 200 to the reference numerals  in the first embodiment, are given to the corresponding components, and redundant explanations are omitted.

Figure 9:
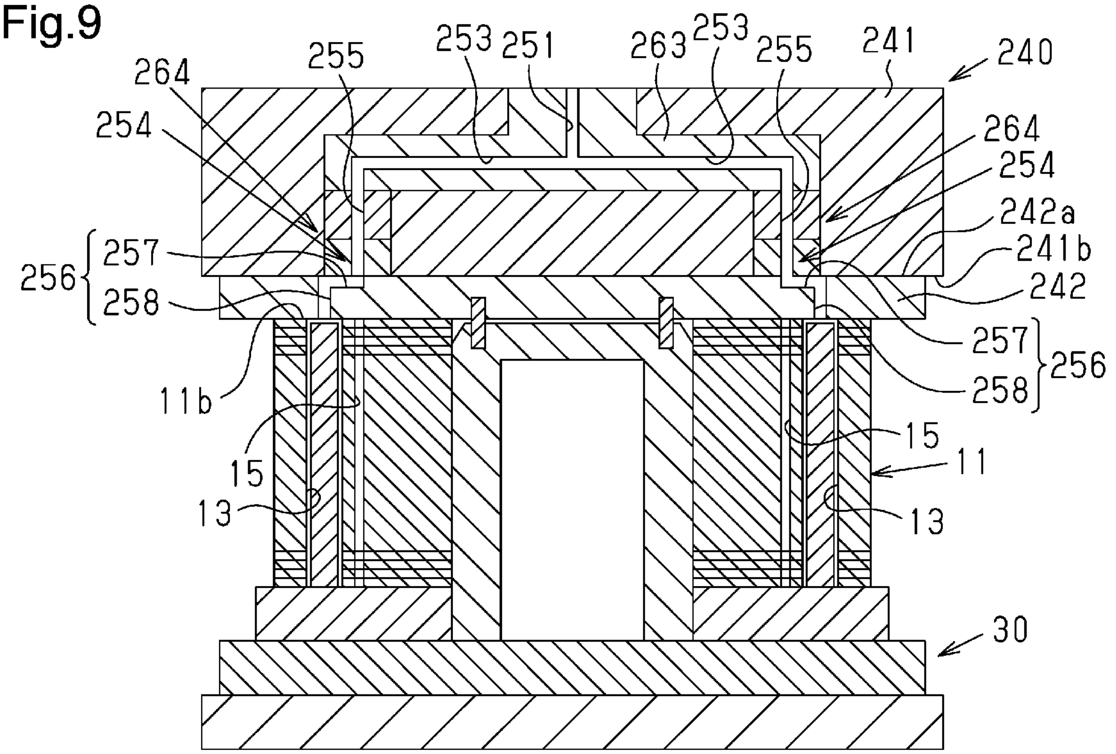
FIG. 9 is a cross-sectional view of an apparatus for manufacturing a rotor according to a third embodiment.

As shown in FIG. 9, a second die 240 includes a second die body 241 and a plate portion 242. The second die body 241 includes a sprue portion 251, manifold portions 253, upstream sections 255 of nozzle portions 254, a manifold heating portion 263, and nozzle heating portions 264. The upstream sections 255 extend downward from the manifold portions 253 along the axis C and open in a lower surface 241*b* of the second die body 241. The upstream sections 255 are located at positions that overlap with the cooling holes 15 in the axial direction (see FIG. 10). The plate portion 242 is disposed between the second die body 241 and the second end face 11*b* of the rotor core 11 and includes downstream sections 256. In the present embodiment, two downstream sections 256 are connected to each upstream section 255.

Figure 10:
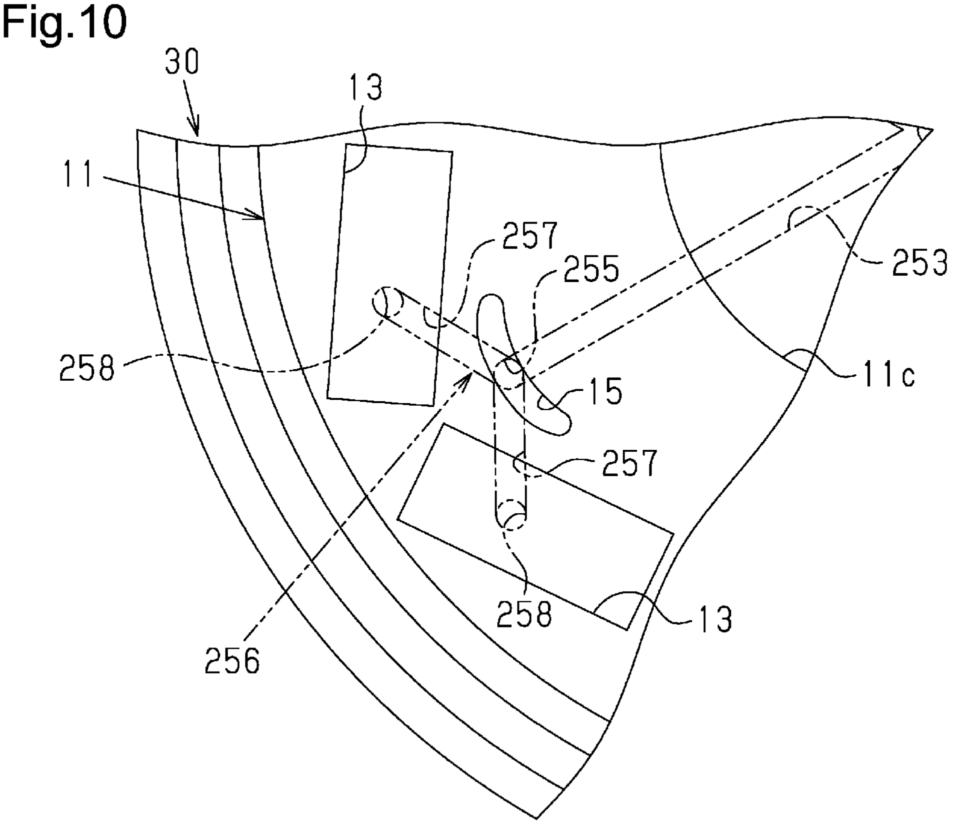
FIG. 10 is a plan view of the apparatus for manufacturing a rotor shown in FIG. 9, showing a second end face of a rotor core.

As shown in FIGS. 9 and 10, each downstream section 256 includes first parts 257, which extend from the distal end, or the lower end, of the upstream section 255 toward the corresponding magnet housing holes 13, and second parts 258, which extend from the first parts 257 toward the rotor core 11. Each first part 257 is a groove that extends linearly and opens in the upper surface 242*a* of the plate portion 242 (refer to FIG. 9). The second parts 258 are holes that extend in the axial direction through the plate portion 242, and are provided at positions overlapping with the magnet housing holes 13 in the axial direction. The first parts 257 and the lower surface 241*b* of the second die body 241 define passages that connect the upstream sections 255 and the second parts 258 to each other.

In addition to the advantages (1-1) to (1-5) of the first embodiment, the third embodiment has the advantage described below.

(3-1) The second die 240 includes the second die body 241, which includes the sprue portion 251, the manifold portions 253, the upstream sections 255 of the nozzle portions 254, the manifold heating portion 263, and the nozzle heating portions 264. The second die 240 includes the plate portion 242, which is disposed between the second die body 241 and the second end face 11*b* and includes the downstream sections 256.

This configuration allows the plate portion 242 to be replaced with a plate portion 242 having different arrangement of the downstream sections 256, which form the nozzle portions 254. Thus, a common second die body 241 can be used for rotor cores 11 having different arrangements of the magnet housing holes 13.

Modifications

The first to third embodiments may be modified as follows. The first to third embodiments and the following modifications can be combined as long as the combined modifications remain technically consistent with each other.

In each of the above-described embodiments, the measuring step is performed. However, this is not a limitation. The measuring step may be omitted.

In the third embodiment, the first parts 257 of the downstream sections 256 may be holes that extend through the plate portion 242, and the second parts 258 may be grooves that open in the lower surface of the plate portion 242. In this case, the downstream sections 256 may be located at positions that do not overlap with the cooling holes 15 of the rotor core 11 in the axial direction.

Figure 11:
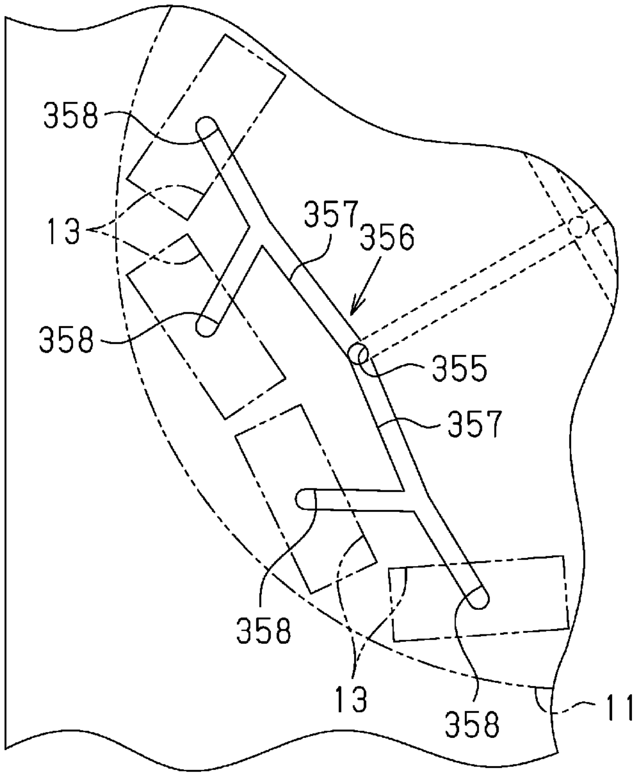
FIG. 11 is a bottom view of a modification of a passage.

The downstream sections 56, 256 may be connected to three or more of the magnet housing holes 13. For example, as shown in FIG. 11, each downstream section 356 may include two first branching parts 357, which extend from the distal end of the upstream section 355, and second branching parts 358, which extend from the distal end of each first branching part 357 toward the magnet housing holes 13.

The nozzle heating portions 64 may include only the first nozzle heating sections 65 or only the second nozzle heating sections 66. Alternatively, each first nozzle heating sections 65 and the corresponding second nozzle heating section 66 may replaced with a single nozzle heating section.

The nozzle heating portions 64 do not necessarily need to be provided separately for each of the nozzle portions 54, 154, and 254. For example, a common nozzle heating portion may be provided for two or more nozzle portions 54, 154, and 254.

In each of the above-described embodiments, the manifold portions 53 are each heated by the manifold heating portion 63. However, this is not a limitation. Manifold heating portions may be provided for each of the multiple manifold portions 53, 153, 253.

In each of the above-described embodiments, the manifold heating portion 63 and the nozzle heating portions 64 are provided. However, this is not a limitation. For example, the passage 50 may be heated by a heater that heats the entire second die 40.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method for manufacturing a rotor, the method comprising:

housing magnets in magnet housing holes in a rotor core;

introducing, through a passage, thermoplastic in a molten state into openings in a state in which a first end face and a second end face of the rotor core are respectively in contact with a first die and a second die, thereby filling the magnet housing holes, which house the magnets, with the thermoplastic; and cooling the thermoplastic, wherein the filling the magnet housing holes, which house the magnets, with the thermoplastic includes heating the thermoplastic in the passage with a heater, wherein the passage includes a sprue portion connected to a nozzle of an injection molding machine, and a runner portion connected to the sprue portion, the sprue portion is provided on an axis of the rotor core, the runner portion includes:

multiple manifold portions that extend radially from the sprue portion in radial directions of the rotor core; and multiple nozzle portions that extend from the manifold portions toward the rotor core, the nozzle portions are respectively connected to the manifold portions, the heater includes:

a manifold heating portion configured to heat the manifold portions; and multiple nozzle heating portions configured to heat the respective nozzle portions, and each nozzle portion includes an upstream section, extending from a corresponding manifold portion, and multiple downstream sections, each of which branches from a distal end of the upstream section toward respective magnetic housing holes.

2. The method for manufacturing a rotor according to claim 1, wherein the method for manufacturing the rotor further comprises measuring a flowability of the thermoplastic at each of the nozzle portions prior to the filling the magnet housing holes, which house the magnets, with the thermoplastic; and the measuring the flowability of the thermoplastic at each of the nozzle portions includes:

by using a rotor core different from the rotor core to be used in the filling the magnet housing holes, which house the magnets, with the thermoplastic, introducing, through the passage, the thermoplastic in a molten state into the second openings in a state in which the first end face and the second end face of the rotor core are respectively in contact with the first die and the second die; and measuring the flowability of the thermoplastic at each of the nozzle portions based on a filling state of the thermoplastic in the magnet housing holes, wherein the filling the magnet housing holes, which house the magnets, with the thermoplastic includes controlling each of the nozzle heating portions such that one or more of the nozzle portions that have been measured to have a relatively low flowability of the thermoplastic in the measuring the flowability of the thermoplastic become hotter than one or more of the nozzle portions that have been measured to have a relatively high flowability of the thermoplastic in the measuring the flowability of the thermoplastic.

* * * * *